United States Patent [19]

Leatherman

[11] 4,029,837

[45] June 14, 1977

[54] COMPOSITE PLASTIC-METALLIC BONDING MEANS AND METHOD

[75] Inventor: Alfred F. Leatherman, Columbus, Ohio

[73] Assignee: William C. Heller, Jr., Milwaukee, Wis.

[22] Filed: Aug. 14, 1975

[21] Appl. No.: 604,833

[52] U.S. Cl. .............................. 428/247; 156/272; 156/309; 428/256; 428/269

[51] Int. Cl.$^2$ ..................... B32B 7/00; B32B 15/00

[58] Field of Search ......... 156/310, 313, 315, 309, 156/272; 428/256, 212, 297, 457, 247, 255, 238, 239, 269

[56] References Cited

UNITED STATES PATENTS

| | | | |
|---|---|---|---|
| 3,435,127 | 3/1969 | Rose et al. | 428/256 |
| 3,900,360 | 8/1975 | Leatherman | 156/310 |
| 3,932,249 | 1/1976 | Jury et al. | 428/256 |

Primary Examiner—James J. Bell
Attorney, Agent, or Firm—Andrus, Sceales, Starke & Sawall

[57] ABSTRACT

A stratified structure suitable for joining first and second thermally bondable bodies exhibiting bonding incompatibility. The structure includes a first layer having bonding compatibility with a first of the bodies, a second material layer having bonding compatibility with a second of the bodies and a metallic mesh interposed between the first and second layers for providing internal cohesion and integrity to the bonding agent. The metal mesh also provides a means by which the structure may be heated as by exposure to an alternating magnetic field. In bonding the first and second bodies, the composite bonding agent is positioned between the two bodies and exposed to the alternating magnetic field to effect heat seals between the bodies and the agent and thus between the two bodies.

20 Claims, 6 Drawing Figures

COMPOSITE PLASTIC-METALLIC BONDING MEANS AND METHOD

BACKGROUND OF THE INVENTION

1. Field of the Invention

The present invention relates to stratified structures for bonding plastic materials.

2. Description of the Prior Art

In recent years, the greater understanding of structure-property relationships of plastic materials the the introduction of new polymerization techniques and monomers have resulted in the availability of a large number of different types of plastics having a wide variety of properties. Plastic materials can be produced with the ideal properties necessary for a specific application. For instance, plastics may be hard or soft; rigid or flexible, rubbery, leathery, or glassy; porous or non porous; transparent or pigmented; thermosetting or thermoplastic, etc. These varying properties result from differences in chemical composition, atomic arrangement, molecular weight, and other structural aspects of the plastics.

In many instances, plastics having diverse properties are incorporated in a single plastic article. For example, a plastic package may include a transparent rigid window portion formed of polymethacrylate mounted on an opaque, tough housing of reclaimed non transparent polyvinyl chloride. The latter material is low in cost but does not offer the necessary transparent qualities. In another application, it may be desired to provide fasteners on a polypropylene sheet. While the fasteners may be injection molded during the formation of the sheet, such a process leaves a dent on the side of the sheet opposite the fastener. Further, a fastener formed of polypropylene may not have the necessary mechanical strength. It is, therefore, preferable to affix a nylon fastener to the polypropylene sheet.

In other applications, parts of an article may be porous while other parts are non porous. The fabrication of such articles may be accomplished by numerous, available techniques, such as the use of adhesives, mechanical fasteners, and the like.

A preferable method of assembling plastic articles utilizes the thermal properties of the plastics to effect joinder. For example, the abutting portions of two plastic article portions may be heated to fusion temperature and then pressed together to effect a heat seal between the portions.

However, the differing structure and properties of the plastics often cause a greater or lesser degree of thermal bonding incompatability between the materials which prevents formation of a satisfactory heat seal. This phenomenon has proven particularly troublesome in the fabrication of articles having portions of differing plastic materials and is proving to be an even greater impediment to fabrication as the number of diverse property and structure plastics continues to increase. Further, in cases in which a usable heat seal can be effected, this seal may be subsequently rendered ineffectual by conditions to which the article is exposed in use, such as oxidizing or temperature conditions.

SUMMARY OF THE PRESENT INVENTION

It is, therefore, the object of the present invention to provide a means and method for thermally joining plastic or plastic coated elements exhibiting mutual bonding incompatibility.

The present invention contemplates the use of a composite bonding agent imbued with sufficient compatibility toward each of the elements to effect a thermal heat seal between the agent and each of the elements, and thus between the two elements.

It is a further object of the present invention to provide a composite bonding agent and method employing same for providing high strength joinder of diverse property and structure plastics in a rapid and inexpensive fashion.

It is a further object of the present invention to provide such a composite bonding agent which has sufficient internal or cohesive strength to obviate failure of the heat seal between the elements in the bonding agent. The internal cohesive strength of the composite bonding agent at least equals, and in most cases exceeds, the strength of the bond between the agent and the elements.

Briefly, the aforementioned composite bonding agent comprises a stratified structure including a first material layer having a bonding compatibility with the plastic of one of the elements and a second material layer having a bonding compatibility with the plastic of the other elements. The composite bonding agent is bound into an integral cohesive mass, and any incompatibility which may exist between the layers of the agent overcome, by the incorporation of a metallic mesh, for example, a fine metallic screen between the layers. The internal cohesive strength of the pagent is obtained not only by a mechanical interlocking of the layers to the mesh, but also by the reinforcement provided by the strength of the mesh. Thus, any incompatibility with exists in the overall bond between the two elements occurs where reinforcement in the form of the high strength mesh is available and the effects of such incompatibility are effectively negated.

The mesh is also heatable upon exposure to an alternating magnetic field for heating the composite bonding agent to the heat sealing temperatures.

The composite bonding agent so formed is usable in a bonding process in which the thermally bondable plastic or plastic coated elements to be joined are juxtapositioned with the composite bonding agent between them. The composite bonding agent is positioned so that the layers are adjacent the elements with which they have bonding compatibility. The composite bonding agent is then subjected to the alternating magnetic field to heat the mesh and the adjacent portions of the elements to heat sealing temperatures to affect a heat seal between the plastics of the two elements and the composite bonding agent and thus between the two elements.

A method for making the composite bonding agent having the properties, and usable in the method, described above typically includes the steps of providing a first material layer having bonding compatibility with one of the thermally bondable plastic or plastic coated elements, heating the first material layer to plasticity, impressing a metallic mesh into an exposed surface of the first material layer to mechanically join the first layer to the mesh, and applying a second material layer having bonding compatibility with the other thermally bondable plastic or plastic coated elements to the mesh to mechanically join the second layer to the mesh.

DESCRIPTION OF THE PREFERRED EMBODIMENT

Figure 1:
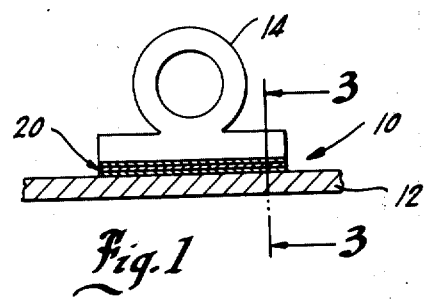
FIG. 1 is a cross sectional view of a portion of a thermoplastic article formed with the composite bonding agent and method of the present invention.

In FIG. 1 there is shown a multi-piece plastic article 10. Article 10 includes a sheet 12 which, for purposes of illustration, may be assumed to be formed of polypropylene. Article 10 also includes fastener 14 shown illustratively as an eye. Fastener 14 may be formed of high strength plastic materials, for example, nylon.

Polypropylene sheet 12 and nylon fastener 14 must be joined together. As noted supra, because of the differences in the structure and properties of polypropylene and nylon, a seal between the two elements having the necessary strength and other properties has been difficult to obtain in the past.

Figure 2:
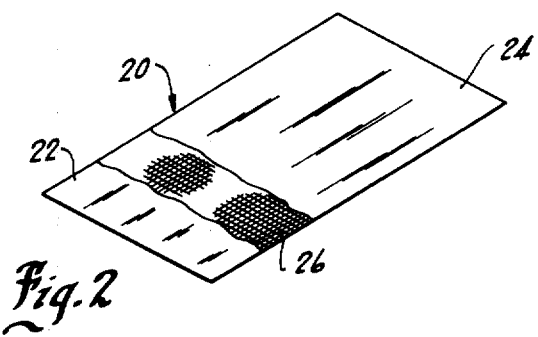
FIG. 2 is a partially cut away perspective view of the composite bonding agent of the present invention showing the various elements thereof.
Figure 3:
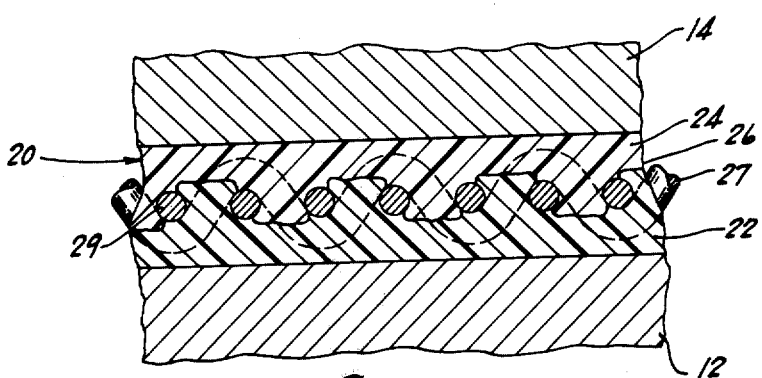
FIG. 3 is an enlarged partial cross sectional view of the composite bonding agent of the present invention taken along the line 3—3 of FIG. 1.

In accordance with the present invention, a composite bonding agent 20 is employed to effect the seal between sheet 12 and fastener 14. Composite bonding agent 20 is shown in greater detail in FIGS. 2 and 3. As shown therein, composite bonding agent 20 is a multi-layer or stratified structure. In the orientation shown in the Figures, a bottom layer 22 is comprised of a thermoplastic material which exhibits a high degree of bonding compatibility with the polypropylene material of sheet 12. Such compatibility may be evidenced by mutual soluability, similarity in heat sealing temperatures, and similar properties. For example, layer 22 may be formed of polypropylene sheeting having properties similar or identical to those of the material of sheet 12. The sheeting may be flexible or rigid, as desired.

The upper layer 24 of composite bonding agent is formed of a thermoplastic material which exhibits a high degree of bonding compatibility with the nylon of fastener 14. For example, layer 24 may be formed of a nylon material having properties similar or identical to those of the material or fastener.

Interposed between layers 22 and 24 is a metallic mesh for providing cohesiveness and heat generating properties to composite bonding agent 20. The mesh may comprise an open screen 26. Screen 26 may typically be formed of wires 27 of steel or other ferromagnetic metal.

Layers 22 and 24 are coupled to the strands 27 by flowing into the mesh and around the wires of screen 26. The layers engage the wires for over one half their circumferences so as to resist separation of the layers and the mesh. The surface elevation and depressions typical of a woven mesh caused by the crossing of the wires permit each layer to grip the raised wires on the side of the mesh adjacent it. In many cases the wires will be mechanically submerged in one or both of the layers so as to be encapsuled by the layers to further assist in the joinder of the layers. The cohesion obtained in composite bonding agent 20 is thus procured by mechanical interlocking the layers in the wires 27 of screen 26. Any incompatibility in the joinder of layers 22 and 24 is thus reinforced by the presence of screen 26. In use, the high strength of screen 26 serves to absorb the forces exerted on bonding agent 20 thus leaving layers 22 and 24 free to perform their bonding function. The mechanical interlocking of layers 22 and 24 and screen 26 is aided by whatever direct bonding between the materials of layers 22 and 24 which may occur in the interstices and elsewhere in screen 26. However, the main joinder action is that of the mechanical interlocking.

The degree of reinforcement provided by the presence of screen 26 may be controlled by selection of the type of screen, the size of the interstices between the wires of the screen, the thickness of the wires with respect to the interstices, and the type of weave used to form the screen. An open weave has been found more suitable to the practice of the present invention than a tight weave.

If desired, the wires 27 of screen 26 may be coated with the plastics of layers 22 and 24 prior to weaving to enhance the flow of the layers around the screen. For example, prior to weaving screen 26, the weft may be coated with the polypropylene of layer 22, as by extrusion, while the warp is coated with the nylon of layer 24. Screen 26 is then woven and applied between layers 22 and 24.

As noted supra, screen 26 preferably is formed of ferromagnetic materials heatable by a high frequency alternating magnetic field. Steel, iron, nickel, and cobalt possess ferromagnetic properties as do alloys of these metals. If desired, other metals such as aluminum or copper may be utilized.

Figure 4A:
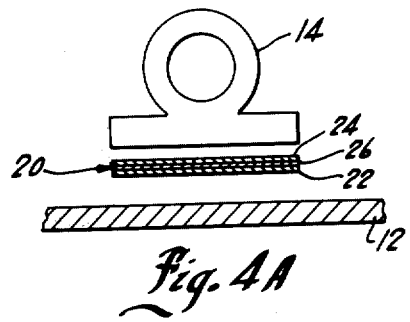
FIGS. 4a and 4b are partial cross sectional views of the thermoplastic article of FIG. 1 illustrating a method employing the composite bonding agent shown in FIGS. 3 and 2.

To form article 10, sheet 12 and fastener 14 are juxtapositioned so that the surfaces to be sealed are in opposing relationship. Composite bonding agent 20, formed as described above, is inserted between the opposing surfaces, as shown in FIG. 4a, with layer 24 facing fastener 14 and layer 22 facing sheet 12.

Figure 4B:
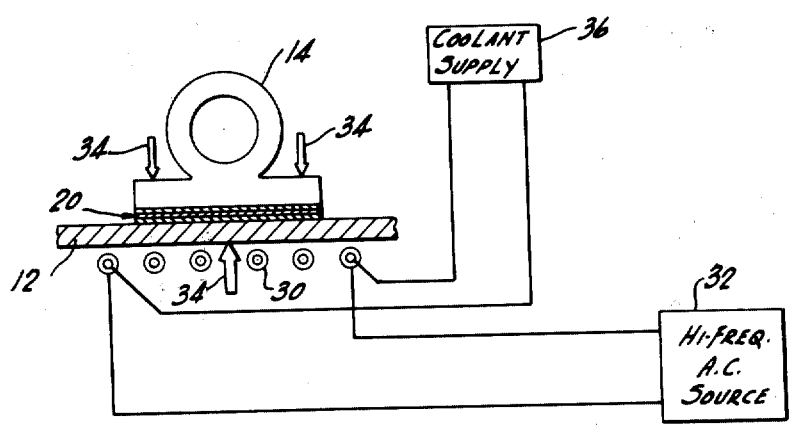

The surfaces of sheet 12 and fastener 14 which are to undergo sealing are then placed in contact with composite bonding agent 20. A means for providing an alternating magnetic field is brought into proximity with the composite bonding agent. This means may typically comprise coil 30 shown in cross section in FIG. 4b. Coil 30 is energized by a source 32 of alternating current. The frequency of the magnetic field produced by coil 30 may typically range between 60 hertz and 30 megahertz with a preferred range of 100 to 600 kilohertz. Such relatively low frequencies permit use of low cost commercially available generating equipment and efficient utilization of large size coils 30. Large size plastic structures may thus be bonded with agent 20.

Upon exposure to the high frequency alternating magnetic field provided by coil 30, screen 26 becomes heated, heating layer 24 and layer 22. The heating of these layers, in turn, results in a raising of the temperature of sheet 12 and fastener 14 to the heat sealing point. As sheet 12 and fastener 14 reach heat sealing temperature, a bond is formed between sheet 12 and layer 22 and fastener 14 and layer 24. This bond may be assisted by pressure applied in the direction of arrow 34 against the article portions.

The heating of screen 26 may be quite rapid depending on the size of screen 26. Times on the order of 0.1 seconds may be expected. Once the desired heat seals have been obtained, the magnetic field produced by coil 30 may be removed, as by disconnecting coil 30 from high frequency alternating current source 32 or by physically removing the coils from proximity to composite bonding agent 20. Because of the rapid heating of screen 26 and the rapid formation of the necessary heat seals, sheet 12 and fastener 14 retain their body chill which assists in cooling the seal areas and completion of the heat seals. If desired, or necessary, coolant from coolant supply 36 may be circulated in the coils 30 to assist in cooling the seal areas.

In the completed joint, the bonding compatibility existing between sheet 12 and layer 22 and fastener 14 and layer 24 insures a high strength between these elements. Screen 26 reinforces composite bonding agent 20 to lend commensurate strength to the bonding agent itself.

Figure 5:
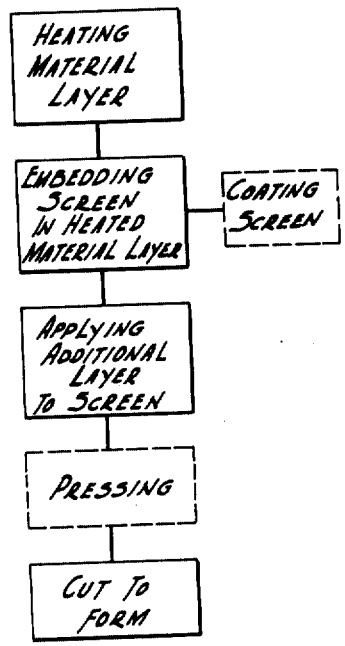
FIG. 5 is a block diagram illustrating the method of the present invention for manufacturing the composite bonding agent.

A method for forming composite bonding agent 20 is shown in flow diagram form in FIG. 5. One of layers 22 or 24 may be heated to a point of softening as by laying it on a heated plate or by other means.

Screen 26 is laid on the softened surface of the heated material layer. Screen 26 may be pre-coated with the layer materials as noted above. Depending on the degree of softening, screen 26 may partially sink into the layer by its own weight to provide the desired mechanical attachment with the layer. If the desired interlocking is not thus obtained, the screen 26 may be pressed into the layer to the necessary extent by a diffused force applied normal to the surface of the layer.

The second layer, such as layer 24, is then applied to the remaining exposed surface of screen 26. This may be done in any convenient manner compatible with mechanical and thermal properties of the materials of the layers. Casting or extrusion coating may be employed. Coating, as by brushing may also be employed. In connection with the polypropylene-nylon example described above, the composite bonding agent may be formed by heating a sheet of polypropylene and pressing the screen into its softened surface. The nylon material may then be thermally softened and applied to the exposed surface of the screen. The nylon material may also be applied by coating the exposed surface of the screen with a solution of nylon in a solvent. This secures better penetration of the nylon material into the mesh but the strength is not quite as high as when the material is melted and applied to the mesh.

If the resulting composite bonding agent 20 is thicker than desired, the composite may be hot pressed to a thinner and more uniform thickness. The completed composite bonding agent 20 is then cut into the desired form necessary for the bonding application, such as the strips shown in FIGS. 1 and 4.

It will be appreciated that numerous modifications of the above described invention may be made. The exact formulation of layers 22 and 24 may be selected to suit specific bonding applications and may comprise, but are not limited to, various combinations of ABS (acrylonitrile-butadiene-styrene), acetals, acrylics, allyl resins and monomers, cellulosics, chlorinated polyethers, fluoroplastics, nylon, polycarbonates, polyesters, polyethylene, polypropylene, polyurethane, polybutylene, and vinyl polymers and copolymers.

One or both of layers 22 and 24 may be provided with a coloring agent, such as a particulate pigment, so as to make the composite bonding agent the same color as the article portions being joined or to distinguish the bond by its color from the article portions. Coloring of one or both of layers 22 and 24 may be used as an indication of the orientation of the layers and their compatibility properties to an operator utilizing the agent.

Various modes of carrying out the invention are contemplated as being within the scope of the following claims particularly pointing out and distinctly claiming the subject matter which is regarded as the invention.

I claim:

1. A composite bonding agent suitable for joining first and second thermally bondable plastic bodies having at least some mutual bonding incompatibility comprising, in a generally stratified, integral configuration:
   a first thermoplastic material layer having thermal fusion bonding compatibility with the first body;
   a second thermoplastic material layer having thermal fusion bonding compatibility with the second body, said first and second layers having bonding incompatibility with each other; and
   an inductively heatable metallic mesh interposed between said first and second layers, said mesh having a lattice of interwoven wires which mechanically interlock with said layers for providing internal cohesion to the composite bonding agent.

2. The composite bonding agent according to claim 1 wherein at random locations throughout the composite bonding agent the material of said layers occupies the interstices between the wires of the lattice for more than one half the perimeter of the adjacent wires to provide mechanical interlocking between the layers and the mesh.

3. The composite bonding agent according to claim 1 wherein at random locations throughout the composite bonding agent the material of the layers completely surrounds the wires.

4. The composite bonding agent according to claim 1 wherein said metallic mesh comprises a lattice of strands coated with the material of said first and second layers.

5. The composite bonding agent according to claim 1 wherein at least one of said first and second material layers contains a coloring agent.

6. The composite bonding agent according to claim 1 further defined as having the first and second bodies fusion bonded to said first and second material layers, respectively.

7. A method for forming a composite bonding agent of high internal cohesive strength for joining first and second thermally bondable bodies exhibiting at least some mutual bonding incompatibility, said composite bonding agent including first and second thermoplastic material layers having bonding compatibility with said first and second bodies, respectively, and bonding incompatibility with each other, said method comprising the steps of:
   positioning the first thermoplastic material layer to present an exposed surface;
   impressing an inductively heatable metallic wire mesh in the exposed surface of the first layer so that portions of the wires of the mesh are embraced about more than half their perimeter by the first material layer; and applying the second thermoplastic material layer to the metallic wire mesh so that portions of the second material layer embrace wires of the mesh about more than half their perimeters.

8. The method according to claim 7 further defined as softening the first material layer to plasticity prior to impressing the mesh therein.

9. The method according to claim 8 further defined as softening the first material layer by heating.

10. The method according to claim 7 further defined as applying pressure normal to the exposed surface of the first material layer subsequent to applying the second material layer.

11. The method according to claim 7 wherein the step of applying the second material layer is further defined as coating the second material layer on the exposed surface of the mesh.

12. The method according to claim 11 wherein the step of applying the second material layer is further defined as painting the second material layer on the exposed surface of the mesh.

13. The method according to claim 7 wherein the step of impressing the mesh is further defined as impressing the mesh in the exposed surface of the first layer so that portions of the wires of the mesh are surrounded by the first material layer and the step of applying the second layer is further defined as applying the second material layer to the mesh so that portions of the second material layer surround the wires of the mesh.

14. The method according to claim 7 further defined as dispersing a coloring agent in at least one of the first and second material layers.

15. The method according to claim 7 further including the initial step of coating the mesh with the material of said first and second layers prior to impressing the mesh in the exposed surface of the first layer.

16. A process for joining first and second thermally bondable bodies exhibiting at least some mutual fusion bonding incompatibility by means of a composite bonding agent including first and second thermoplastic material layers integrally joined by a medial inductively heatable metallic mesh, said first and second thermoplastic material layers having fusion bonding compatibility with said first and second bodies, respectively, and bonding incompatibility with each other, said method comprising the steps of:

juxtapositioning the first and second bodies so that the portions thereof to be bonded are contiguous;

inserting the bonding agent between the bodies with the thermoplastic material layers adjacent the bodies with which they have bonding compatibility;

exposing the composite bonding agent to an alternating magnetic field having a frequency of between 60 hertz and 600 kilohertz to heat the metallic mesh, the material layers, and the adjacent portions of the bodies to fusion bonding temperatures; and bringing said first and second bodies into abutment with said composite bonding agent to form fusion bond with said first and second material layers, respectively.

17. The method according to claim 16 further defined as applying pressure normal to the area of fusion bonding at least subsequent to exposing the composite bonding agent to the alternating magnetic field.

18. The method according to claim 15 including the terminal step of cooling the first and second bodies and the composite bonding agent to fully form the fusion bond.

19. The composite bonding agent according to claim 1 wherein said metallic mesh is formed of a ferromagnetic material.

20. The composite bonding agent according to claim 19 wherein said metallic mesh is formed from a material class including steel, iron, nickel and cobalt and their alloys.

* * * * *